United States Patent
Prasser et al.

(10) Patent No.: US 6,347,783 B1
(45) Date of Patent: Feb. 19, 2002

(54) ARRANGEMENT FOR PREVENTING UNDESIRABLE PRESSURES WHEN BLOCKING OFF OR THROTTLING THE TRANSPORT OF LIQUID IN A PIPELINE

(75) Inventors: Horst-Michael Prasser, Dresden; Stefan Schlueter, Oberhausen; Andreas Dudlik, Essen, all of (DE)

(73) Assignees: Forschungszentrum Rossendorf E.V., Schoenfeld-Weissig; Fraunhofer-Gesellschaft zur Foerderung der angewandten Forschung E.V., Munich, both of (DE)

( * ) Notice: Subject to any disclaimer, the term of this patent is extended or adjusted under 35 U.S.C. 154(b) by 0 days.

(21) Appl. No.: 09/602,881

(22) Filed: Jun. 26, 2000

(30) Foreign Application Priority Data

Aug. 24, 1999 (DE) .......................... 199 40 096

(51) Int. Cl.⁷ ............................................. F16K 31/72
(52) U.S. Cl. ..................................... 251/64; 137/561 R
(58) Field of Search ................. 251/64; 137/561 R, 137/624.27

(56) References Cited

FOREIGN PATENT DOCUMENTS

| DE | 2346754 | 2/1975 |
|---|---|---|
| DE | 2010414 | 6/1983 |
| DE | 211615 | 7/1984 |
| DE | 19815242 | 10/1999 |
| WO | WO94/02775 | 2/1994 |

OTHER PUBLICATIONS

"Fluid Transients in Pipeline Systems" by A.R.D. Thorley, D & L George Ltd., 1991, Hadley Wood, Barnet, GB.
Raschke, E., Salla, M., Hueltenschmidt, W.: "Pressure Surge Dampened, Pipeline Protected—Condensation Knocks in Pipelines Under the Dampening Influence of Gases," Verfahrenstechnik 7–8/97, pp. 45–49.
Raschke, E., Seelinger, A., Sperber, A Strassburger, A.: "Simulation of the Unsteady Hydraulic Behavior of Chemical Engineering Plants with Long Pipelines," Chem.–Ing.–Tech. 66 (1994) 5, pp. 652–660.

*Primary Examiner*—John Fox
(74) *Attorney, Agent, or Firm*—Jordan and Hamburg LLP

(57) ABSTRACT

The object of the invention is to propose an arrangement, with which, when shutting-off or throttling the transport of a liquid with a fitting, the occurrence of undesirable pressures in the pipeline is prevented reliably without supplying air or other gases into the pipeline, as well as without using an air chamber or an auxiliary fitting or additional controllers and without specifying a fixed shutting off and throttling rate. The implementation of the invention shall prevent impermissible pressures upstream as well as downstream of the shutting-off fitting.

Figure 1:
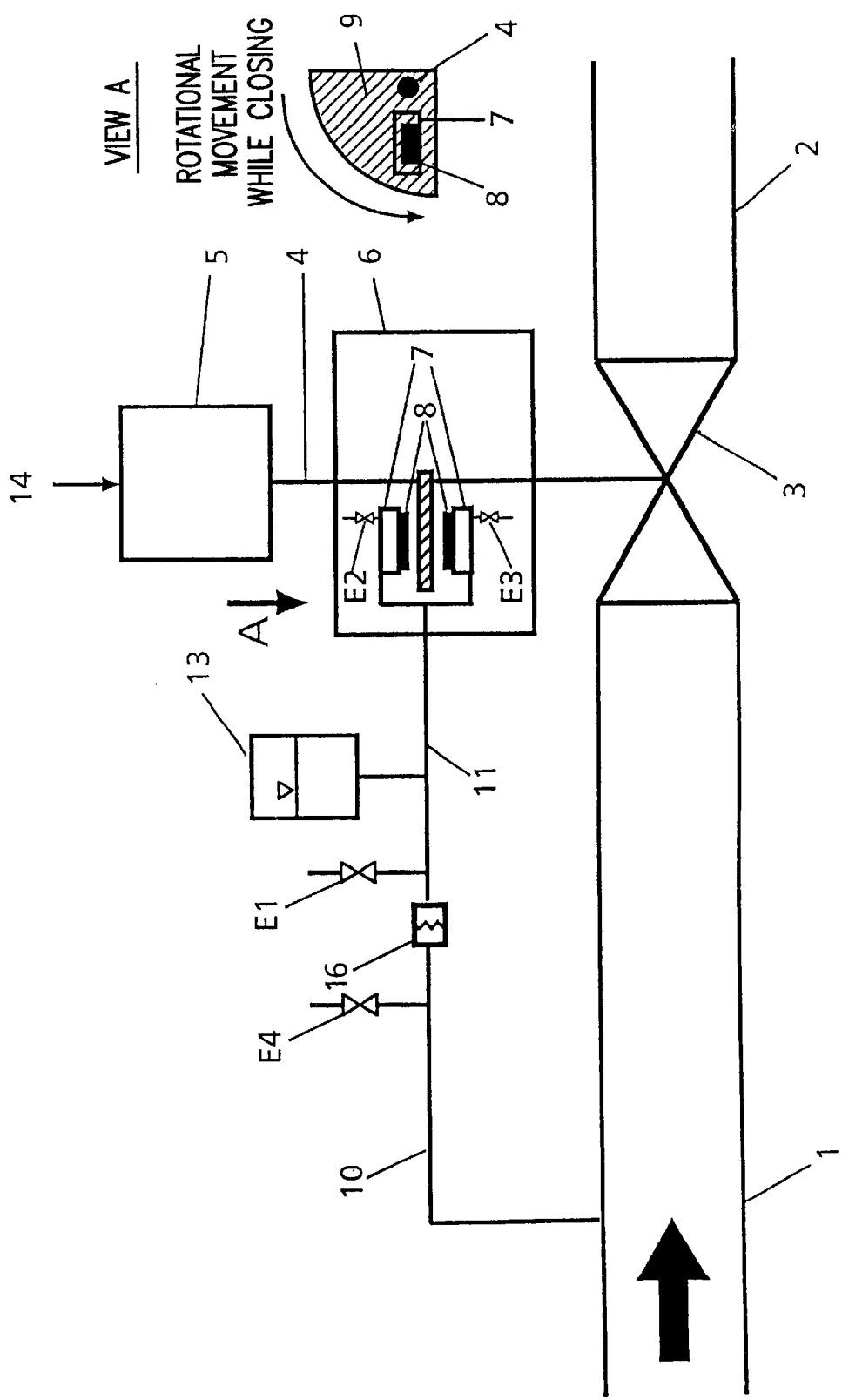

The invention provides that a braking system is connected with the pipeline and is driven by liquid pressure in the pipeline, acting on the drive shaft, the drive spindle or the drive rods of the shutting-off or throttling fitting.

9 Claims, 3 Drawing Sheets

ARRANGEMENT FOR PREVENTING UNDESIRABLE PRESSURES WHEN BLOCKING OFF OR THROTTLING THE TRANSPORT OF LIQUID IN A PIPELINE

The invention relates to an arrangement for preventing undesirable pressures, which occur when fittings are subjected to rapid control processes, particularly during rapid shutting-off or throttling processes in pipelines conveying liquid, by activating rapidly-acting valves or gates (shut-off fittings), when the flow of the liquid column is decelerated shortly after the valve is actuated. Because the liquid is decelerated, the pressure increases rapidly upstream of the fitting. A pressure surge develops, which represents a strain for the pipeline, the support for the pipeline as well as for the fitting itself. Downstream, there is a drop in pressure. If at the same time the pressure drops below the vapor pressure of the liquid, a cavitation bubble is formed, which subsequently collapses once again which, in turn, leads to pressure surges, the so-called cavitation knocks. In some cases, for example, when certain pipeline materials are used, a lower limit is specified for the permissible pressure, below which the pressure may not the drop during shutting-off or throttling processes.

In many technical applications, it is necessary to shut off or throttle the flow of liquids in pipelines as quickly as possible. Examples are pipelines for conveying liquid materials in chemical plants from one step of the process to another, plants for filling liquids, which may contaminate the environment, into tanks, tank cars or tankers, or beverage filling plants. Rapidly acting shut-off fittings are also provided, in order to limit the amount of medium emerging from a leak in the case of a line break and to prevent the malfunction from spreading.

Pressure surges generally are reduced in magnitude by setting the shutting-off or throttling rate of the fitting at a lower value. Experience has shown that the pressure surge at the admission side can be controlled by these means only if the plant and operating conditions of the pipeline correspond to the parameters set for the fitting. Furthermore, it is difficult to prevent a cavitation knock downstream from the shut-off fitting by decreasing the shut-off or throttling rate, because a cavitation bubble can be formed behind the fitting even when the shutting-off or throttling times are longer, especially if the pipeline is very long (Thorley, A. R. D., "Fluid Transients in Pipeline Systems", D & L George LTD, 1991, Hadley Wood, Barnet, GB). With this, there is in most cases, from the very start, an incompatibility between a fixed, reduced shutting-off and throttling rate, and the requirement that the pipeline be shut off in the shortest possible time even under the varying operating and plant conditions. The procedure can therefore frequently not be used to prevent pressure surges and cavitation knocks.

One possibility for preventing pressure surges upstream from the shutting-off or throttling fitting is to discharge the medium being transported rapidly into a different section of the pipeline, which is opened when a limiting pressure or flow rate is reached (DD patent 211615). A similar method is pursued by Gustavsson to avoid pressure surges in remote heating pipelines with forward and reverse flow. Upon shutting off, the forward and reverse flow is coupled, so that a pressure increase is prevented (WO patent 94/02775). The diversion of the medium being transported with a subsequent, slow closing of the main fixture, is also known (DD Offenlegungsschrift 23 46 754). It is a disadvantage of the last-mentioned inventions that, in addition to a large expenditure for measurements, additional pipeline sections and/or buffer containers must be integrated in the transporting pipeline system.

A further possibility consists of measuring and limiting the pipeline pressure or the rate of pressure increase by a high-speed pressure measuring and control system. When a maximum pressure or a maximum rate of pressure increase is exceeded, the high-speed controller interrupts the shutting-off or throttling process of the fitting (DD patent 201 041). This procedure makes the highest demands on the measurement and control technology. Moreover, the driving mechanism of the shutting-off or throttling fitting must be in a position to interrupt the shutting-off or throttling process within very narrow time limits of a few milliseconds. It must be assumed that the development and investment costs are high here.

One possibility of preventing particularly the cavitation knock consists of venting or of feeding other noncondensable gases into the pipeline behind the shut-off fitting (Raschke, E., Salla, M., Hültenschnmidt, W.: "Pressure Surge Dampened, Pipeline Protected—Condensation Knocks in Pipelines Under the Dampening Influence of Gases," Verfahrenstechnik 7–8/97, pp. 45–49). For this purpose, a venting fitting is mounted close behind the shut-off fitting and, when a reduced pressure occurs behind the shut-off fitting, opens automatically and admits a certain amount of air into the transporting pipeline. In this case, it is assumed that the reduced pressure results from the presence of a cavitation bubble. The air flowing in leads to a partial increase in the reduced pressure of the cavitation bubble. In addition, due to the presence of the air, the condensation rate of the vapor during the reverse flow phase of the liquid is greatly decreased. Thirdly, after complete condensation of the vapor, an air bubble remains in the pipeline, which dampens the pressure surge by its compressibility. All three of the effects mentioned lead to a reduction in the pressure peaks during the cavitation knock. In practice, air frequently cannot be used, because it reacts with the liquid or contaminates it impermissibly. In these cases, other gases, which do not react with the liquid, are used. In every case, it is a disadvantage that the liquid, which is to be transported, is contaminated by the gas supplied.

Furthermore, the possibility exists of reducing the pressure surges by installing air chambers in front of or behind the shut-off fitting. In front of the fitting, the air chamber creates a volume for accommodating liquid, as a result of which the braking of the liquid colunmn proceeds more slowly and the pressure peak is minimized. An air chamber behind the shut-off fitting provides volume, so that the formation of the cavitation bubble is hindered (Raschke, E., Seelinger, A., Sperber, A., Straßburger, A.: "Simulation of the Unsteady Hydraulic Behavior of Chemical Engineering Plants with Long Pipelines," CIT 66 (1994) 5, pages 652–660). Under normal operating conditions, air chambers are partly filled in both cases with the liquid, which is to be transported and over which there is an air cushion. It is a disadvantage that the air chamber takes up additional space and that the solubility of the gas in the liquid in the air chamber leads to a contamination of the liquid that is to be transported in the pipeline. In addition, it is necessary to make up for gases lost because of solubility.

In order to prevent cavitation knocking, it has already been proposed to provide an auxiliary fitting in the pipeline behind the shut-off fitting. The driving mechanism of the auxiliary fitting is connected over a threshold switch and a flow sensor with the pipeline (German patent application, file No. 198 15 242.6). A check valve can also function as auxiliary fitting. The auxiliary fitting prevents collapse of the cavitation bubble. However, it does not prevent a reduction in the pressure, downstream from the shut-off fitting, to the level of the vapor pressure. In many cases, however, the drop in pressure below a certain limiting pressure above the vapor pressure must be prevented, for example, when pipelines of composite materials are used, the liner of which could become detached. In addition, the auxiliary fitting prevents the cavitation knock but not the pressure surge in front of the shut-off fitting.

It is an object of the invention, to provide an arrangement, with which the shutting-off or throttling process of the shutting-off fitting can be carried out in the shortest possible time, independently of changing plant and operating conditions of the pipelines, at a pressure, which does not exceed a specified pressure in the pipeline or drop below a specified limiting value downstream from the shut-off fitting. The arrangement shall function without the introduction of air or other gases into the pipeline, in order to exclude contaminating the liquid conveyed. Expensive facilities, such as air chambers, complicated control devices for the shutting-off or throttling fitting and extensive installations for the diversion of the liquid transported shall be avoided.

Pursuant to the invention, the objective is accomplished by the distinguishing features given in the claims.

An undesirable pressure increase is prevented by reducing the shutting-off or throttling rate of the shutting-off fitting with the help of a hydraulic brake, which acts on the driving linkages such as the axis of rotation, spindle or lifting rod of the shut-off fitting and is actuated by the pressure of the liquid being transported directly upstream from the shut-off fitting. When the pressure increases, the brake is tightened and the closing process is slowed down. When the pressure drops once again, the brake is released and the shutting-off or throttling process is continued.

For limiting the pressure drop downstream from the shutting-off fitting, a brake is used, which is connected downstream from the shutting-off fitting directly with the liquid that is being conveyed. The brake, which also acts on the driving linkages, that is, the axis of rotation, the spindle or the lifting rod of the shutting-off fitting, is connected so that a pressure decrease leads to a tightening of the brake and, with that, to a slowing down of the shutting-off or throttling process. When the pressure rises once again, the brake is released and the shutting-off or throttling process continued.

When the liquid is transported in the pipeline at an elevated temperature, the tightening of the brake already at the normal operating pressure or the interference of the operating pressure with the required tightening of the brake when the pressure decreases downstream from the shutting-off fitting must be prevented. For this case, the hydraulic brake is constructed as a double-action brake. A brake is used with a brake cylinder, which has a plus and a minus input and the braking action is determined by the pressure difference between the two inputs. The plus input of the braking cylinder is connected with the pipeline directly upstream from the shutting-off fitting, while the minus input is connected with the pipeline directly downstream from the shutting-off fitting. For normal operation, the pressure difference between the plus input and the minus input is too small for initiating a braking process. The action of the brake is independent of the operating pressure. When the shutting-off fitting is actuated, the pressure at the plus input increases, while the pressure at the minus input decreases, as a result of which a braking action occurs.

When the increase in pressure resulting from the braking of the liquid being transported during the actuation of the shutting-off fitting is insufficient for reaching the required braking force, which leads to a delay in the shutting-off or throttling process, a braking force amplifier should be installed in the connecting pipeline between the pipeline and the brake. The same applies in the event that the decrease in pressure downstream from the shutting-off fitting is insufficient for initiating the braking process. Likewise, braking force amplifiers can be provided and the level of the pressures in the plus and minus lines can be amplified individually. However, an amplification of the pressure difference can also be employed.

In many cases, it is not desirable that the liquid conveyed reaches the hydraulic brake or the brake force amplified. This is the case particularly if corrosion, abrasion or blockage can occur. The brake can be operated with a separate brake fluid and the pressure transferred from the fluid conveyed to the brake fluid by an elastic membrane, which separates the two liquids from one another.

The invention is explained in greater detail in the following by means of three examples. In the associated drawing, FIG. 1 shows the inventive arrangement with a membrane, FIG. 2 shows the inventive arrangement with a brake force amplifier and FIG. 3 shows the arrangement of FIG. 2 with an additional connecting pipeline.

According to FIG. 1, in its construction with the pipeline upstream 1 and downstream 2, the shutting-off fitting 3, into which the liquid flows in the direction of the arrow, with the driving linkages 4 as drive shaft, the drive mechanism 5, the hydraulic brake 6 as a disk brake, the brake cylinder 7, the brake shoes 8, the brake disk 9, the connecting pipelines 10 and 11, the membrane 16, the brake fluid container 13, the shutting-off or throttling signal 14, as well as the venting fittings E1, E2, E3 and E4, the liquid being transported, which flows in the pipeline 1 or 2 through the shutting-off fitting 3, over a connecting pipeline 10, which is connected with the pipeline 1 upstream in the vicinity of the shutting-off fitting 3, is connected with an elastic membrane 16. The pressure of the liquid being conveyed is transferred over the membrane 16 to the brake fluid in the connecting pipeline 11 and exists at the brake cylinder 7. When the shutting-off or throttling signal 14 is activated, the driving mechanism 5 carries out a rotational movement of the drive shaft 4, which leads to the shutting off or throttling of the shutting-off fitting 3. By braking the liquid conveyed, the pressure in the pipeline 1 increases. The increase in pressure is transferred over the connecting pipelines 10 and 11 as well as the membrane 16 to the braking cylinder 7, as a result of which the brake shoes 8 are pressed against the brake disk 9. The rotational movement of the drive shaft 4 is retarded by these means, until the pressure in the pipeline 1 drops off once again. By these means, it is ensured that the pressure in the pipeline 1 cannot exceed a maximum pressure.

For the satisfactory functioning of the arrangement, it is a prerequisite that the pipelines 10, 11 and the brake cylinder 7 are vented satisfactorily over venting valves E1 to E4. It is possible to do without the membrane 16, if the nature of the liquid, which is being conveyed, is such that it may reach the brake cylinder because it does not bring about any undesirable corrosion, abrasion or blockage effects.

Figure 2:
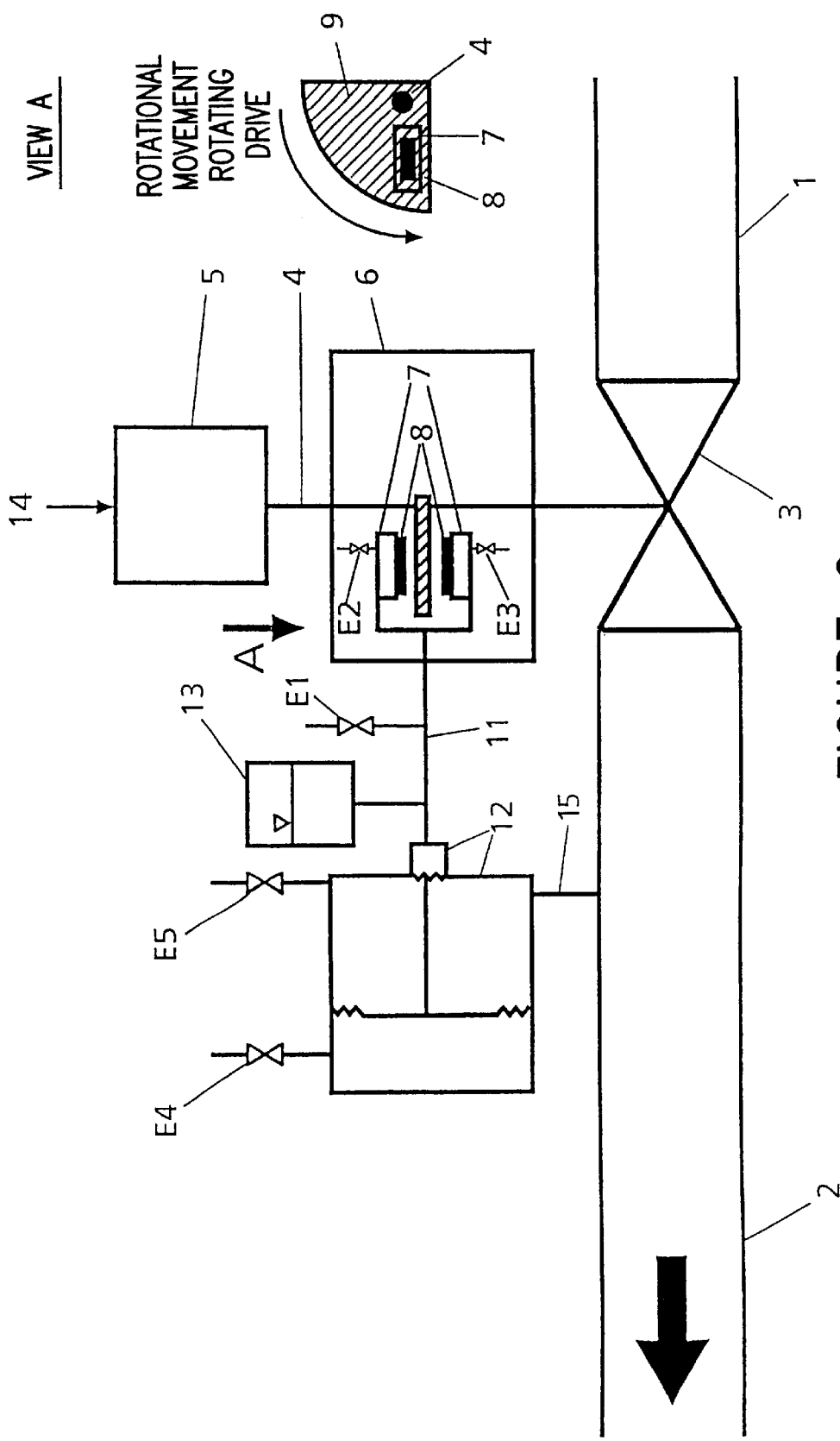
Figure 3:
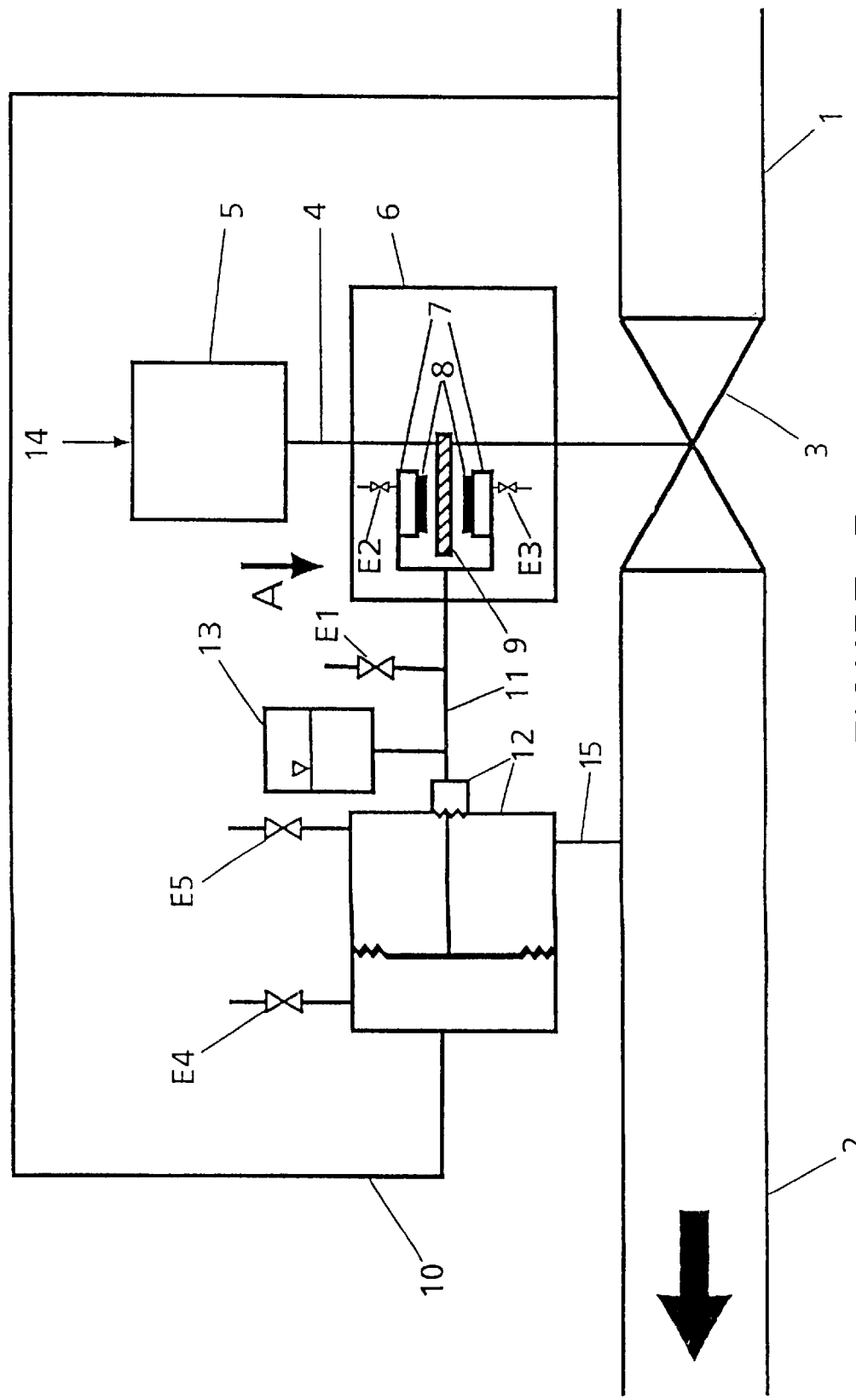

According to FIG. 2, in its embodiment with the pipeline upstream 1 and downstream 2, the shutting-off fitting 3, into which the liquid flows in the direction of the arrow, with the drive shaft 4, the driving mechanism 5, the disk brake 6, its brake cylinders 7, the brake shoes 8, the brake disk 9, the connecting pipelines 15 and 11, the brake force amplifier 12, the brake fluid container 13, the shutting-off or throttling signal 14, as well as the venting fittings E1, E2, E3, E4 and E5, the liquid being transported, which flows in the pipeline 1 or 2 through the shutting-off fitting 3, is connected over a connecting pipeline 15, which is connected with the pipeline 2 downstream in the vicinity of the shutting-off fitting 3, with the brake force amplifier 12. The pressure of the liquid being conveyed is transferred over the brake force amplifier 12 to the brake fluid in the connecting pipeline 11 and exists in the brake cylinders 7. When the shutting-off or throttling signal 14 is activated, the driving mechanism 5 carries out a rotational movement of the drive shaft 4, which leads to a shutting off or throttling of the shutting-off fitting 3. Due to the braking of the liquid being conveyed, the pressure in pipeline 2 drops off. The pressure drop is transferred over the connecting pipelines 15 and 11 as well as the brake force amplifier 12 to the brake cylinders 7, as a result of which the brake shoes 8 are pressed against the brake disk 9. The rotational movement of the drive shaft 4 is delayed by these means, until the pressure in the pipeline 2 increases once more. By these means, it is ensured that the pressure in the pipeline 2 cannot fall below a minimum pressure.

It is a prerequisite for the satisfactory functioning of the arrangement that the pipelines 15, 11 of the brake force amplifier 12 and the brake cylinders 7 are vented satisfactorily over the venting valves E1 to E5. The braking force amplifier 12 is equipped in this example with elastic membranes.

According to FIG. 3, in its construction with the pipeline upstream 1 and downstream 2, the shutting-off fitting 3, into which the liquid flows in the direction of the arrow, with the drive shaft 4, the drive mechanism 5, the disk brake 6, its brake cylinders 7, the brake shoes 8, the brake disk 9, the connecting pipelines 10 and 11, the braking force amplifier 12, the brake fluid container 13, the shutting-off or throttling signal 14, the connecting pipeline 15 as well as the venting fittings E1, E2, E3, E4 and E5, the liquid being transported, which flows in the pipeline 1 or 2 through the shutting-off fitting 3, is connected over a connecting pipeline 15, which is connected downstream near the shutting-off fitting 38 with the pipeline 2, as well as over a connecting pipeline 10, which is connected upstream near the shutting-off fitting 3 with the pipeline 1, with the braking force amplifier 12. The connecting pipeline 10 is connected to the plus input and the connecting pipeline 15 to the minus input of the braking force amplifier 12. The pressure difference in the liquid conveyed over the shutting-off fitting 3 is amplified by the braking force amplifier 12, transferred to the brake fluid in the connecting pipeline 11 and exists in the brake cylinders 7. When the shutting-off fitting is open, the pressure difference is small, so that an unwanted response of the disk brake 6, resulting only from the normal pressure in the pipeline 1 and 2, is prevented. When the throttling signal 14 is activated, the driving mechanism 5 carries out a rotational movement of the drive shaft 4, which leads to a partial shutting off or throttling of the shutting-off fitting 3. Due to the braking of the liquid conveyed, the pressure in pipeline 2 decreases and the pressure in pipeline 1 increases. This means that the pressure difference and, with that, the pressure in the connecting pipeline 11 and in the brake cylinders 7 increases, as result of which the brake shoes 8 are pressed against the brake disk 9. The rotational movement of the drive shaft 4 is delayed by these means, until the pressure difference once again has dropped below the threshold value. By means of this arrangement, it is ensured that the pressure difference in the pipeline cannot become too large over the shutting-off fitting 3.

For the satisfactory functioning of the arrangement, it is a prerequisite that the pipelines 10, 11 and 15 of the brake force amplifier 12 and the brake cylinder 7 are vented satisfactorily over venting valves E1 to E5. The brake force amplifier 12 in this example is equipped with elastic membranes.

What is claimed is:

1. An arrangement for regulating pressure during shutting off or throttling of fluid in a fluid transporting device comprising:
    a shutting-off fitting through which said transported fluid flows;
    a driving linkage driving the shutting-off fitting;
    a hydraulic brake on said driving linkage for applying a braking force on said driving linkage, said hydraulic brake having a brake cylinder; and
    a connecting pipeline communicating fluid pressure from said fluid transporting device to said brake cylinder such that said hydraulic brake acts on said driving linkage to limit change of fluid pressure of said fluid transporting device from crossing a predetermined pressure level.

2. The arrangement according to claim 1, wherein the connecting pipeline is connected to the fluid transporting device upstream of the shutting-off fitting to limit change in the fluid pressure of the fluid in the transporting device upstream of the shutting-off fitting such that the fluid pressure upstream of the shutting-off fitting is maintained below a predetermined pressure.

3. The arrangement according to claim 1, wherein the connecting pipeline is connected to the fluid transporting device downstream of the shutting-off fitting to limit change in the fluid pressure of the fluid in the transporting device downstream of the shutting-off fitting such that the fluid pressure downstream of the shutting-off fitting is maintained above a predetermined pressure.

4. The arrangement of claims 2 or 3, further comprising:
    a plus input device on the brake cylinder, said plus input device being connected to the fluid transporting device upstream of the shutting-off fitting, and
    a minus input device on the brake cylinder, said minus input device being connected to the fluid transporting device downstream of the shutting-off fitting,
    wherein the brake is a double-acting brake, the braking force of which is determined by a pressure difference between the plus input device and the minus input device.

5. The arrangement of claim 2, further comprising a brake force amplifier connected to the brake cylinder, said brake force amplifier also being connected to the fluid transporting device at a location on the fluid transporting device upstream of the shutting-off fitting.

6. The arrangement of claim 3, further comprising a brake force amplifier connected to the brake cylinder, said brake force amplifier also being connected to the fluid transporting device at a location on the fluid transporting device downstream of the shutting-off fitting.

7. The arrangement of claim 4, further comprising a brake force amplifier connected to the brake cylinder, said brake force amplifier also being connected to the fluid transporting device at a first location upstream of the shutting-off fitting and at a second location downstream of the shutting-off fitting.

8. The arrangement of claims 2, 3, 5, or 6, further comprising:
    an elastic membrane in the connecting pipeline, and a brake fluid in the brake cylinder and a portion of the connecting pipeline between the elastic membrane and the brake cylinder, said brake fluid being different from the fluid in the fluid transporting device.

9. The arrangement of claims further comprising:

an elastic membrane in the connecting pipeline, and a brake fluid in the brake cylinder and a portion of the connecting pipeline between the elastic membrane and the brake cylinder, said brake fluid being different from the fluid in the fluid transporting device.

\* \* \* \* \*